May 9, 1961 C. A. WALLACE ET AL 2,983,383
LIQUID FILTER
Filed Oct. 22, 1956 3 Sheets-Sheet 1

INVENTORS:
CHARLES A. WALLACE
HENRY L. RISKO
BY AHMAD M. EL-HINDI
Curtis, Morris & Safford
ATTORNEYS:

May 9, 1961
C. A. WALLACE ET AL
2,983,383
LIQUID FILTER
Filed Oct. 22, 1956
3 Sheets-Sheet 2
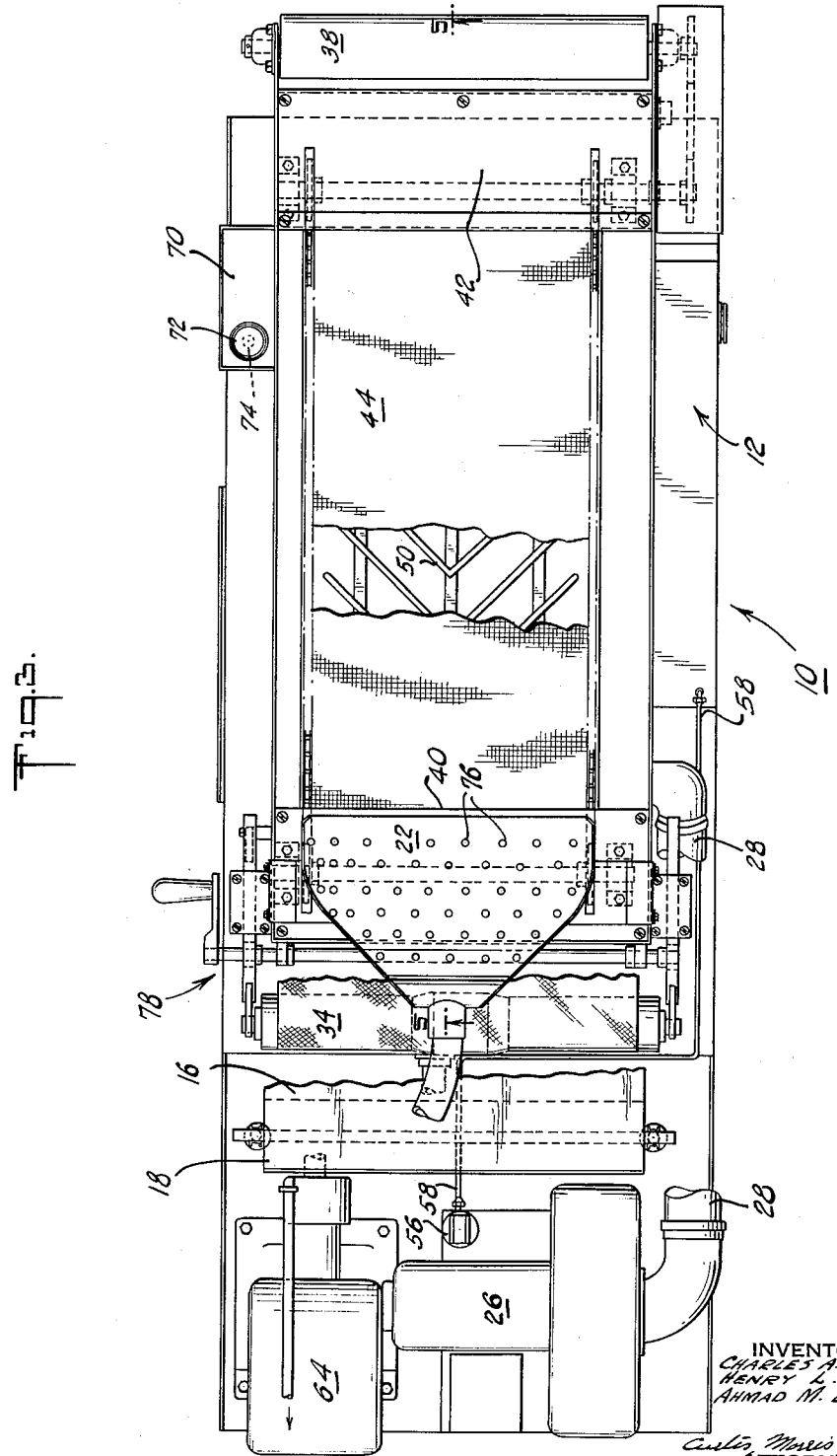
INVENTORS:
CHARLES A. WALLACE
HENRY L. RISKO
AHMAD M. EL-HINDI
ATTORNEYS

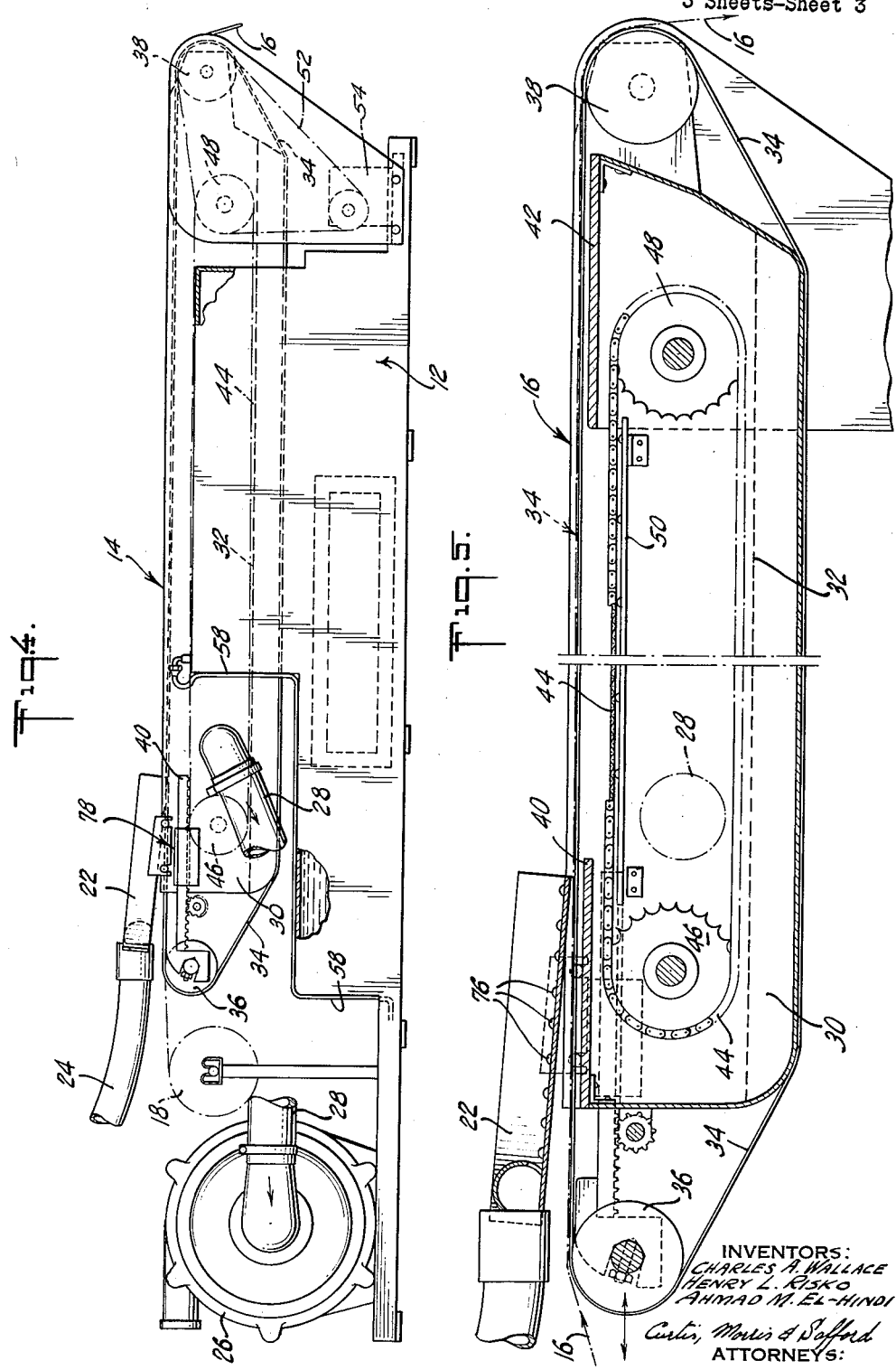

United States Patent Office 2,983,383
Patented May 9, 1961

2,983,383
LIQUID FILTER

Charles A. Wallace and Henry L. Risko, Syracuse, and Ahmad Mohamed El-Hindi, East Syracuse, N.Y., assignors to United States Hoffman Machinery Corporation, New York, N.Y., a corporation of New York Filed Oct. 22, 1956, Ser. No. 617,538

2 Claims. (Cl. 210—97)

This invention relates to an automatic filter for removing sludge, particles, and the like from liquids, especially coolant liquid used with grinders, hones and other machine tools.

An object of this invention is to provide a greatly improved filter of the above type which is reliable and which can operate for long periods of time with but minor maintenance.

A further object is to provide such a filter which can be installed easily in the limited spaces generally available.

A still further object is to provide such a filter which is relatively inexpensive to manufacture and which costs very little to operate.

These and other objects will in part be understood from and in part pointed out in the description given hereinafter.

Many modern machine tools are used with a coolant liquid which is sprayed or poured on a workpiece as it is being machined to help insure proper cutting and to prevent overheating. The coolant is ordinarily pumped continuously onto the work when the machine is in operation and hence it is used in rather large quantities. As the coolant pours over the workpiece, it picks up the fine chips and particles which are produced in the machining operation and in carrying them away is contaminated thereby. Since the usual coolant is relatively expensive it is not economical simply to discard it, it must therefore be reused time after time. Before it is reused, however, it is necessary or at least very desirable to remove from it as nearly completely as possible the entrained sludge and debris which was carried away from the workpiece. This removal requires a filter having a large capacity and a high efficiency. The present invention provides such a filter which has a number of unique advantages in this and other applications.

Various kinds of filters in the past have been used for clarifying coolant liquid. Some filters employed disks or cylinders of various materials such as felt or diatomaceous earth. Though these filters have relatively high sludge removing efficiency the liquid flow through them is comparatively slow and hence a physically large filter for a given rate of flow must be used. Moreover the filter elements used are relatively expensive and need frequent replacement.

Another kind of filter used for the same application is that wherein the filter material is made in the form of an endless belt. Such a filter has high flow capacity but generally relatively low sludge-filtering efficiency. Moreover in most filters of this kind it has in the past been difficult to remove from the filter belt the sludge which accumulated thereon. The present invention overcomes this difficulty and provides a belt type filter which is not only easy to keep clean but which also has very high sludge-removing efficiency.

In filtering liquid coolant for machine tools it is desirable that the coolant be not raised in temperature during the filtering operation. Moreover with certain kinds of coolants it is desirable to aerate them in order to inhibit the growth of certain types of bacteria. It is of course desirable to remove as much of the sludge from the coolant as possible without wasting any of the coolant and so that the sludge is collected in a nearly dry condition. The present invention accomplishes these desirable results and at the same time uses relatively only small amounts of inexpensive and easily obtainable filter material.

The filter unit provided according to this invention for a given physical size of the unit has an exceptionally high filtering capacity but yet gives almost complete separation of sludge from the liquid being filtered. The unit is exceptionally trouble free and will operate automatically for long periods of time, for example, up to four months, before its filter element needs renewal or re-supply.

In accordance with the present invention there is provided a filter unit of the endless belt type having a top run and a return bottom run. A long strip of specially prepared filter paper is placed upon the top run and moves along with it, being unreeled as required at the supply end of the top run from a large supply roll, and being lead at the other end of the top run into a disposal bin. The liquid to be filtered is introduced onto the filter strip from a distributor head positioned, in one embodiment of the invention, near the supply end of the top run, and this liquid flows out upon the strip of filter paper. To cause this liquid to be quickly drawn down through the strip of filter paper and through the top run of the endless belt, the two are carried in unison over a horizontally extended sump tank which is maintained under partial vacuum. The sludge separated from the liquid and collected on the strip of filter paper is moved along with the paper and disposed of at the discharge end of the top run. Normally, the dirty liquid to be filtered covers only part of the filter material over the tank, the remaining portion of the filter having air flowing through it into the tank. Sludge which has accumulated on the latter part of the filter material is thus dried, and the liquid flowing into the tank is aerated and cooled by the evaporation of liquid from the sludge.

The rate at which the endless belt and the filter paper are advanced over the top of the sump tank is controlled automatically, in accordance with the accumulation of sludge on the filter paper, by the increase in the suction or vacuum pressure in the sump tank. Thus, as the filter paper becomes more and more loaded with sludge and less and less liquid and air are able to move downward through the bed of sludge into the tank, the vacuum pressure builds up therein until it reaches a predetermined value at which time the belt is advanced. This advance pulls a clean, unclogged length of the filter paper strip over the sump tank and allows the pressure therein to drop to a lower value, whereupon the advance stops. This operation of starting and stopping is continued so long as the unit is in operation, and liquid to be filtered can be delivered to the unit at a relatively high and constant rate.

Near the discharge end of the top run of the endless belt the sediment bed or cake of sludge which has accumulated on the filter paper has been almost completely dried out and in this condition it is easily disposed of simply by letting the sludge-loaded-end of the strip of filter paper drop into a disposal bin. Because of the cooling action of air passing through the filter belt into the liquid sump tank, the liquid being filtered can be kept near room temperature without any extra provision for cooling.

A better understanding of the invention together with a full appreciation of its many advantages will best be gained from a study of the following description given in connection with the following drawings in which:

Figure 3 is an enlarged top plan view, with parts broken away, of the unit seen in Figure 1;

Figure 4 is an enlarged side view of the unit; and

Figure 5 is a more enlarged side section view of a portion of the unit taken as indicated by lines 5—5 in Figure 3.

Figure 1:
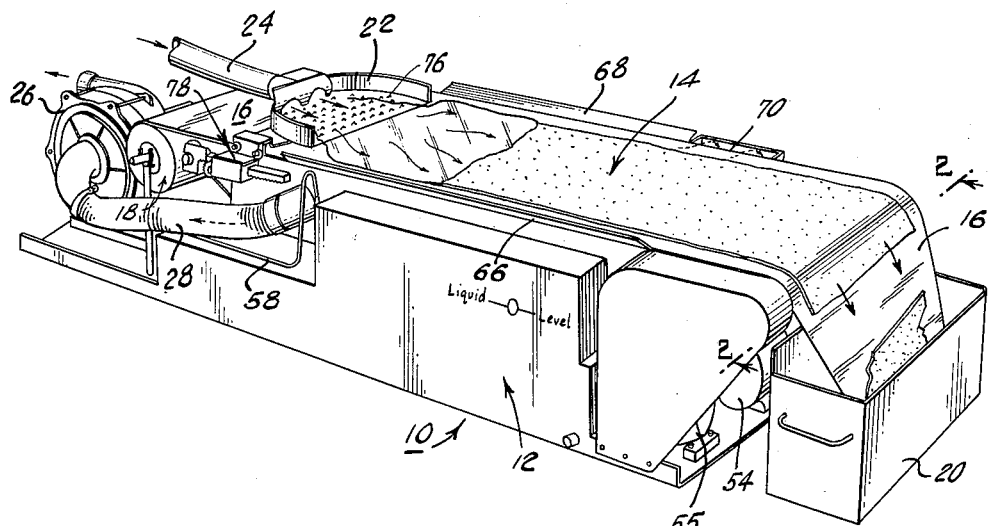
Figure 1 is a perspective view of a filter unit embodying features of the invention.

The filter unit 10 seen in Figure 1 includes a tank portion generally indicated at 12 and a horizontal filter element generally indicated at 14. This filter element consists of a top strip of filter paper 16, which is unwound from a supply roll 18, and which rests upon and is supported by the top run of an endless belt, not revealed here but shown in other figures to be described shortly. The front end of paper strip 16 which is normally loaded with sludge is fed into a disposal bin 20. From time to time when the bin is filled, the paper strip 16 is cut off at the top of the bin which is then emptied.

Near the rear of the filter unit, dirty liquid to be filtered is directed over the top of filter element 14 by the distributor head 22. This liquid is brought to the head by a pipe 24 from a source, not shown, such as the coolant exhaust line of a grinding machine.

Beneath the central portion of filter element 14 within tank 12 is a liquid receiving section shortly to be described in which the filtered liquid passing through element 14 is collected. To speed the flow of liquid through the filter element, tank 12 is maintained under partial vacuum by the air pump 26 connected to the tank by the duct 28.

At intervals determined by variations in the vacuum pressure in tank 12, filter element 14 is advanced a short distance thereby carrying paper strip 16 forward and pulling a fresh portion of it beneath and in front of distributor head 22. Thus the filtering surface is automatically renewed as required.

Referring to Figure 4, the upper portion of tank 12 includes a shallow pan or tray 30 positioned directly beneath the central part of filter element 14. Pan 30 is adapted to receive liquid and to hold it at the level indicated by the dotted line 32. This pan is kept under partial vacuum by duct 28 which opens into its side above the liquid level.

Looped lengthwise around pan 30 is an endless belt 34, of nylon cloth or a similar woven material. Belt 34 is positioned with its bottom run adapted to slide against the outside bottom part of the pan and with its top run supported horizontally just above the top of the pan by the rollers 36 and 38. These rollers are mounted in suitable bearings carried on the opposite sides of unit 10.

Referring to Figure 5, just beneath the top run of endless belt 34 at the two ends of pan 30 are the vacuum sealing plates 40 and 42. The spacing between these plates and belt 34 and of other elements to be described is shown somewhat exaggerated for the purpose of illustration but it is to be understood that during operation of the unit, air pressure holds belt 34 against these plates and thus prevents excessive amounts of air from leaking into pan 30 which is under vacuum.

In the central portion of the unit between the opposed edges of plates 40 and 42, belt 34 and on top of it paper 16 are supported by the top run of endless wire-mesh belt 44. This belt is looped lengthwise around the two rollers 46 and 48 mounted within pan 30. The bottom run of wire belt 44 is held just above the liquid level 32. The top run of belt 44 between rollers 46 and 48 is supported on the herringbone rib structure 50, seen also in Figure 3 which is fixed to the frame of the unit. Again it is to be understood that in Figure 5 the spacings between cloth belt 34, plates 40 and 42, and wire belt 44 have been exaggerated. It will be understood though that the center part of filter element 14, i.e. the portion between plates 40 and 42, is held slightly lower than its ends during operation of the unit. This slight depression in element 14 helps to hold the liquid being filtered in a shallow pool in the center part of element 14.

Figure 2:
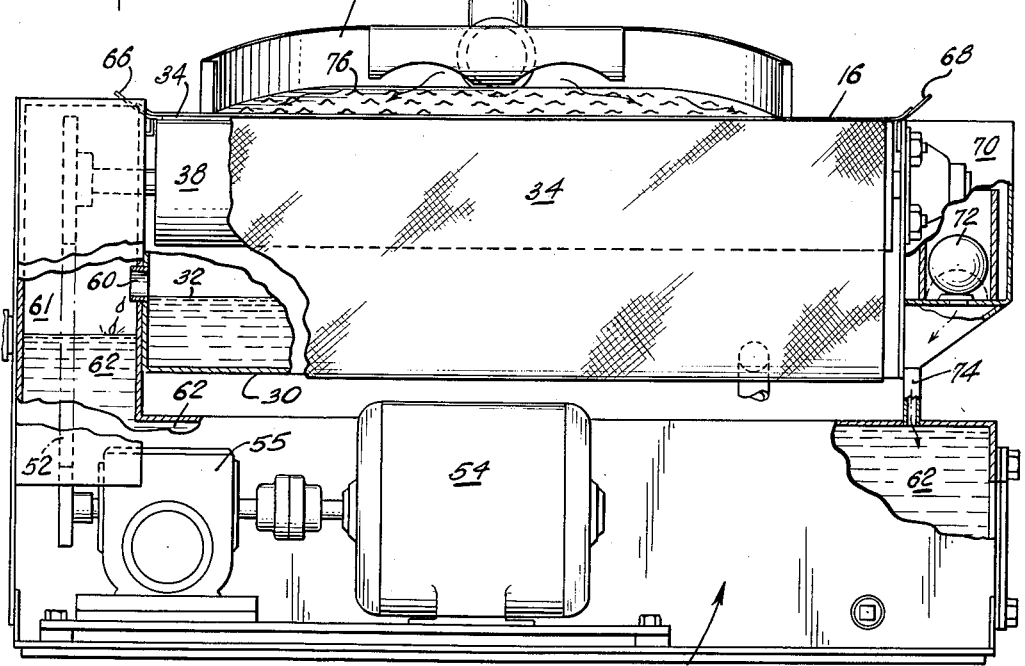
Figure 2 is an enlarged end view, with some parts broken away, taken as indicated by lines 2—2 in Figure 1.

As seen in Figures 2 and 4, the drive for cloth belt 34 and wire belt 44 is provided through an endless chain 52 which engages rollers 38 and 48 and which is driven from the motor 54, and the speed reducer 55. Motor 54 is energized from a suitable source of electric power through an on-off switch 56 seen only in Figure 3. This switch is controlled by the vacuum pressure within tank 12, the pressure being applied to the switch through the air line 58. This switch is closed when the vacuum pressure rises above a given value and is opened when the pressure falls below this value. Thus when switch 56 closes, a fresh section of filter strip 16 is drawn forwardly from beneath head 22 thus renewing filter element 14 as was previously described.

Referring to Figure 2 the liquid within tray or pan 30 is kept at level 32 by the overflow pipe 60 connecting it on the left side with a spillway 61 and a tank 62 underneath pan 30. Tank 62 provides a reservoir for the filtered liquid which can be pumped from this tank by the liquid pump 64, seen in Figure 3, to the place needed, for example to a grinding machine. By virtue of this construction there is provided a small space between the top of tank 62 and the bottom of pan 30 through which the bottom run of cloth belt 34 can pass. Even though pan 30 is shallow, the total liquid holding capacity of the unit can be made relatively large.

As seen in Figure 1, sludge-contaminated liquid flows from distributor head 22 out onto filter element 14 and toward, but not all the way to, the front end thereof. Normally, before any liquid can reach the front end, it is sucked down through paper strip 16, cloth belt 34, metal belt 44 and into pan 30, all that reaches the front end of unit 10 is a relatively dry cake of sludge which has been separated from the liquid. This non-liquid covered portion of the filter material between vacuum sealing plates 40 and 42 permits air to flow simultaneously with liquid into pan or tank 30 giving the improved operation described above.

To prevent the liquid to be filtered from spilling over the sides of filter element 14, the two inclined side rails 66 and 68 are positioned as shown in Figures 1 and 2. Beyond the front end of rail 68 an overflow drain 70 serves to prevent flooding of unit 10 in case of difficulty. Any liquid which might manage to travel this far forward is caught in the drain and returned without filtering to tank 62. As seen in Figure 2, the bottom portion of drain 70 has a float valve 72 which opens when the liquid in the drain rises and allows the liquid to flow through pipe 74 into tank 62.

As is also seen in Figure 2, the side edges of paper strip 16 extend up onto rails 66 and 68 for a short distance. This insures that they are sealed flat against the rails to prevent air leaks. Cloth belt 34 is slightly narrower than paper 16 and does not touch these side rails. Wire belt 44 is somewhat narrower than belt 34.

Distributor head 22 is dimpled along its bottom plate at 76 to cause turbulence to the liquid flowing over it. In this way the accumulation of sludge on the head itself is minimized. Head 22 is mounted as shown in Figure 1 so that its backward and forward position with respect to filter element 14 and belt supporting plate 40 can be adjusted. This adjustment is accomplished through the rack-and-pinion arrangement generally indicated at 78. Normally, the front edge of distributor head 22 is set about even with the front edge of plate 40, as shown for example in Figure 5.

In an actual filter unit, substantially the same as that shown herein, which has been built and successfully operated, the overall width of the unit was approximately 32 inches; the width of paper strip 16 was about 22 inches and was about 2 inches wider than cloth belt 34. The distance between the opposed edges of plates 40 and 42 was approximately 48 inches, the overall length of the unit being about 90 inches. The height of this unit was approximately 20 inches and its coolant filtering capacity was 40 gallons per minute maximum. A 200 foot roll of filter paper lasted four months when used under normal conditions.

The above description of the invention is intended in illustration and not in limitation thereof. Various changes may occur to those skilled in the art and these may be made without departing from the spirit or scope of the invention as set forth.

We claim:

1. A liquid filter unit of the character described comprising a strip of paper-like filter material adapted to be drawn generally horizontally from a supply roll thereof, liquid pervious endless belt means having a generally horizontal top run and a bottom run, said top run being adapted to lie beneath and support said filter material, a long shallow pan positioned between the top and bottom runs of said endless belt means, having an open top and being adapted to receive liquid passing downward through said filter material, a stretch-proof endless belt positioned within said shallow pan with its top surface adapted to support the top run of said liquid pervious endless belt means, a first and a second vacuum sealing plate positioned at the respective ends of said stretch-proof endless belt between its top surface and the bottom of the top run of said liquid pervious endless belt means, two longitudinally extending oppositely inclined guard rails positioned on each side of said strip of filter material and adapted to prevent liquid on top thereof from overflowing, means to discharge liquid to be filtered over a center part of said filter material lying over the top of said pan there being near at least one of said sealing plates a length of said filter material on which sludge accumulates and through which air is drawn into said pan, air pump means to maintain said pan under a partial vacuum and to draw liquid and air through said filter material, means to drive said belt means to advance its top run in a direction away from said supply roll, and switch means controlled by the pressure of said partial vacuum to start and to stop said means to drive.

2. A filter unit for removing sludge and the like from coolant liquid which should be kept near room temperature and which should be aerated, said unit comprising a generally enclosed large reservoir tank for holding a quantity of the filtered coolant, said tank having a top opening and being generally horizontal, an endless coarse mesh supporting belt positioned with its top run spanning the top of said tank, a strip of paper-like filter material positioned on the top run of said belt and being drawn from a supply roll at the rear end of said tank, end and side sealing members on said tank to provide air seals at the side edges of said filter material and at transverse zones near the front and rear ends of said tank, means including an air pump to maintain a negative pressure differential within said tank relative to outside thereof and to cause coolant liquid and simultaneously air to flow downward through said filter material, means responsive to said pressure differential to advance said supporting belt and with it said strip of paper-like filter material to place a fresh piece of said filter material over said tank when said filter material becomes overloaded with sludge, and distributor head means for directing dirty coolant liquid over part only of said filter material between said end sealing members, there being between said end sealing members a length of said filter material on which sludge accumulates and which is normally not covered by liquid, whereby said liquid and air are simultaneously forced down through said paper-like material and belt into said tank and said liquid is thereby filtered, cooled and aerated.

References Cited in the file of this patent

UNITED STATES PATENTS

| | | |
|---|---|---|
| 864,828 | Callow | Sept. 3, 1907 |
| 1,793,449 | Bassler | Feb. 17, 1931 |
| 2,270,938 | Doescher | Jan. 27, 1942 |
| 2,314,294 | Wallny | Mar. 16, 1943 |
| 2,665,812 | Crane | Jan. 12, 1954 |
| 2,675,129 | Doubleday | Apr. 13, 1954 |